(12) United States Patent
Lim et al.

(10) Patent No.: US 9,295,101 B2
(45) Date of Patent: Mar. 22, 2016

(54) METHOD IN WHICH A MOBILE STATION THAT SUPPORTS TWO OR MORE RADIO ACCESS TECHNOLOGIES PERFORMS COMMUNICATION WITH TWO OR MORE NETWORKS

(75) Inventors: Dongguk Lim, Anyang-si (KR);
Hangyu Cho, Anyang-si (KR);
Yeonghyeon Kwon, Anyang-si (KR);
Hyunwoo Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 191 days.

(21) Appl. No.: 13/700,697

(22) PCT Filed: May 27, 2011

(86) PCT No.: PCT/KR2011/003925
§ 371 (c)(1),
(2), (4) Date: Nov. 28, 2012

(87) PCT Pub. No.: WO2011/149314
PCT Pub. Date: Dec. 1, 2011

(65) Prior Publication Data
US 2013/0070718 A1    Mar. 21, 2013

(30) Foreign Application Priority Data
May 28, 2010    (KR) .................. 10-2010-0050253

(51) Int. Cl.
*H04W 88/06*     (2009.01)
*H04W 36/00*     (2009.01)

(52) U.S. Cl.
CPC .......... *H04W 88/06* (2013.01); *H04W 36/0066* (2013.01)

(58) Field of Classification Search
None
See application file for complete search history.

(56) References Cited

U.S. PATENT DOCUMENTS

| 2007/0091844 | A1* | 4/2007 | Huang et al. .................. 370/331 |
| 2009/0034497 | A1 | 2/2009 | Ono |
| 2009/0227209 | A1* | 9/2009 | Craig et al. ................ 455/67.13 |
| 2009/0268685 | A1* | 10/2009 | Chen et al. .................... 370/329 |

(Continued)

FOREIGN PATENT DOCUMENTS

| KR | 10-2006-0043314 | 5/2006 |
| KR | 10-2008-0035856 | 4/2008 |

OTHER PUBLICATIONS

PCT International Application No. PCT/KR2011/003925, Written Opinion of the International Searching Authority dated Feb. 6, 2012, 15 pages.

*Primary Examiner* — Diane Lo
(74) *Attorney, Agent, or Firm* — Lee, Hong, Degerman, Kang & Waimey (57) ABSTRACT

The present invention relates to an apparatus that supports two or more radio access technologies, and to a method in which the apparatus performs communication with two or more networks. A mobile station, which supports two or more radio access technologies and which belongs to a first network, receives a signal from a base station of a second network different from the first network, and transmits feedback information to a base station of the first network in a state in which the access between the mobile station and the base station of the second network is maintained, wherein the feedback information includes channel state information on the received signal, interference level information on the received signal, and/or a reception acknowledgement (ACK) signal or a reception non-acknowledgement (NACK) signal for the receives signal.

14 Claims, 7 Drawing Sheets

(56) References Cited

U.S. PATENT DOCUMENTS

| | | | |
|---|---|---|---|
| 2009/0286563 A1* | 11/2009 | Ji et al. | 455/501 |
| 2010/0054205 A1* | 3/2010 | Kalhan | 370/331 |
| 2010/0317344 A1* | 12/2010 | Dalsgaard et al. | 455/436 |
| 2011/0075611 A1* | 3/2011 | Choi | 370/329 |
| 2011/0268048 A1* | 11/2011 | Toskala et al. | 370/329 |

* cited by examiner

METHOD IN WHICH A MOBILE STATION THAT SUPPORTS TWO OR MORE RADIO ACCESS TECHNOLOGIES PERFORMS COMMUNICATION WITH TWO OR MORE NETWORKS

CROSS-REFERENCE TO RELATED APPLICATIONS

This application is the National Stage filing under 35 U.S.C. 371 of International Application No. PCT/KR2011/003925, filed on May 27, 2011, which claims the benefit of earlier filing date and right of priority to Korean Patent Application No. 10-2010-0050253, filed on May 28, 2010, the contents of which are all hereby incorporated by reference herein in their entirety.

FIELD OF THE INVENTION

The present invention relates to wireless communication, and more particularly to a method for allowing an apparatus supporting two or more wireless access technologies to communicate with two or more networks.

BACKGROUND ART

In a wireless communication system, a variety of errors are inherent to radio frequency (RF) signal propagation over the air interface, thus making data transmission difficult. Because a radio frequency (RF) channel experiences multi-path fading, path loss increases proportional to distance between a mobile station (MS) and a Base Station (BS), etc. as well as thermal noise modeled as Additive White Gaussian Noise (AWGN), it is more difficult to transmit a signal reliably.

To ensure transmission reliability against various changes in channel status and errors during wireless communication, techniques such as 1) Forward Error Correction (FEC) or channel coding, and 2) Automatic Repeat reQuest (ARQ) or Hybrid Automatic Repeat reQuest (HARQ) are widely used.

The HARQ scheme serving as one of error compensation methods for guaranteeing communication reliability is achieved by combining FEC and ARQ. In more detail, the HARQ scheme recognizes whether a physical (PHY) layer includes an error incapable of decoding received data. If the error occurs, the HARQ scheme requests retransmission of data, resulting in an increase in signal transmission/reception performance. The HARQ scheme attempts to perform error checking of the received data, and determines whether to retransmit data using an error detection code. If an error of the received data has been detected in the error detection process, a receiver transmits a negative acknowledgement (NACK) signal to a transmitter. In this case, the transmitter having received the NACK signal transmits appropriate retransmission data according to the HARQ mode.

Figure 1:
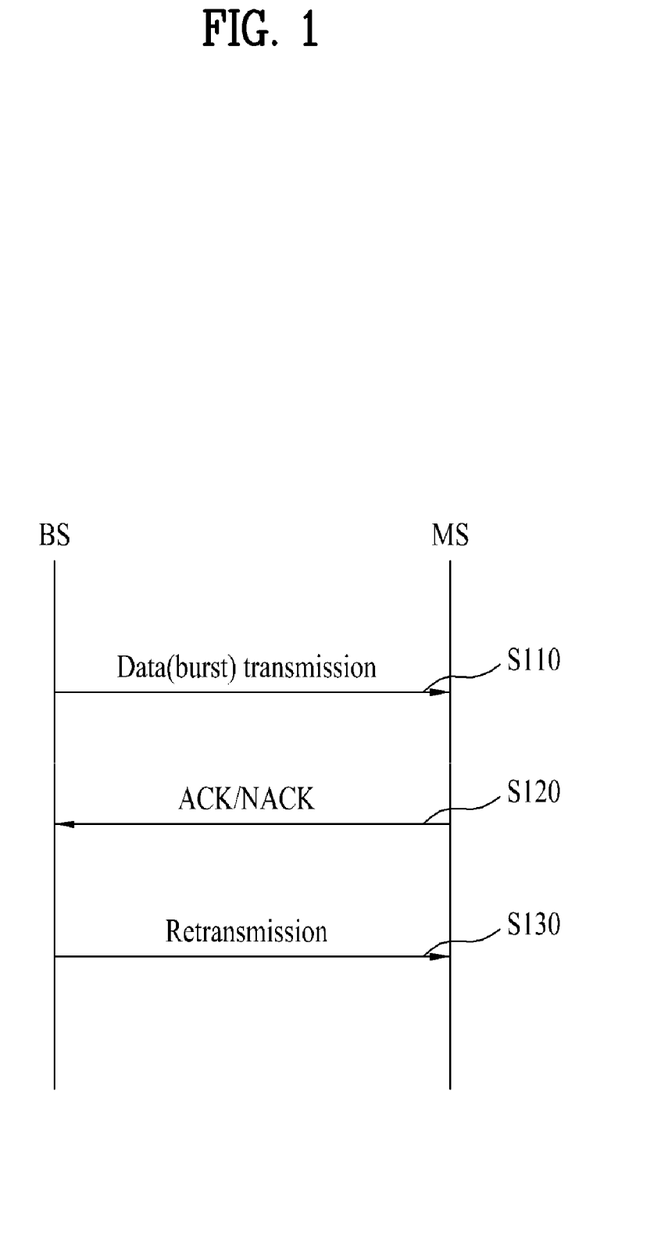
FIG. 1 is a conceptual diagram illustrating an HARQ transmission procedure on downlink.

The HARQ scheme is applied to unicast data transmission on uplink or downlink, and a detailed description thereof is shown in FIG. 1.

FIG. 1 is a flowchart illustrating an HARQ transmission procedure on downlink.

Referring to FIG. 1, a base station (BS) transmits data (or burst) to a mobile station (MS). The MS having received data from the BS transmits a NACK signal on the condition that an error occurs in the data or an information block cannot be decoded. If no error occurs in data and an information block can be decoded, the MS transmits an ACK signal to the BS in step S120. Here, the ACK signal means success of data transmission, and the NACK signal means failure of data transmission and also indicates a data retransmission request. If the BS has received the ACK signal from the MS, the BS need not retransmit data to the MS. However, if the BS receives the NACK signal from the MS or if the BS does not receive ACK/NACK signals for a predetermined period of time, the BS retransmits data to the MS in step S130.

In this case, the ACK/NACK signals are processed for an ACK/NACK time delay serving as a processing time on the basis of a data transmission time of the BS, and are then transmitted. In this case, the ACK/NACK signals are transmitted through an HARQ feedback channel. In this case, the HARQ feedback channel may include at least one ACK/NACK signal, may include at least one orthogonal frequency division multiplexing (OFDM) symbol in a time domain, and may include at least one subcarrier in a frequency domain. In addition, one HARQ feedback channel signal may be FDM (frequency division multiplexing)-, TDM (time division multiplexing)-, and CDM (code division multiplexing)-processed and then transmitted. The HARQ method for data transmission from the BS to the BS can be equally applied even to data transmission from the MS to the BS.

As described above, although methods for transmitting feedback information such as HARQ ACK/NACK in a single network have been proposed in the conventional art, a method for transmitting feedback information on the condition that a specific device (MS or BS) uses a heterogeneous network (or a plurality of wireless access technologies) has not been proposed yet.

DETAILED DESCRIPTION OF THE INVENTION

Technical Problem

Accordingly, the present invention is directed to an apparatus supporting two or more wireless access technologies so as to communicate with two or more networks.

An object of the present invention is to provide a method for allowing an apparatus supporting two or more wireless access technologies so as to communicate with two or more networks.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for performing, by a mobile station (MS) supporting two or more radio access technologies, communication with two or more networks, the method including: receiving, by the MS belonging to a first network, a signal from a base station (BS) of a second network corresponding to a heterogeneous network different from the first network; and transmitting feedback information to a base station (BS) of the first network, wherein the feedback information includes channel state information of the received signal, interference level information of the received signal, and at least one of acknowledgement (ACK) and negative acknowledgement (NACK) information of the received signal, when the MS maintains connection to the BS of the second network.

In another aspect of the present invention, a mobile station (MS) for communicating with two or more networks includes: a reception module configured to receive, a signal from a base station (BS) of a second network corresponding to a heterogeneous network different from the first network; and a transmission module, when the MS maintains connection to the BS of the second network, configured to transmit feedback information to a base station (BS) of the first network, wherein the feedback information includes channel state information of the received signal, interference level information of the received signal, and at least one of acknowledgement (ACK) and negative acknowledgement (NACK) information of the received signal.

Effects of the Invention

As is apparent from the above description, the embodiments of the present invention perform communication using two or more networks according to mobility, channel environment, and communication environment of the apparatus supporting two or more wireless access technologies, such that more efficient communication can be performed at higher speed.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE system, but the present invention is not limited thereto and the remaining parts of the present invention other than unique characteristics of the 3GPP LTE system are applicable to other mobile communication systems.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, the eNode B (eNB) may refer to an arbitrary node of a network end which communicates with the above terminal, and may include a base station (BS), a Node B (Node-B), an access point (AP) and the like.

In a mobile communication system, the UE may receive information from the eNode B via downlink, and may transmit information via uplink. The information that is transmitted and received to and from the UE includes data and a variety of control information. There are a variety of physical channels according to categories of transmission (Tx) and reception (Rx) information of the UE.

Two or more different heterogeneous networks may be present in a current communication environment. For example, a variety of heterogeneous networks (such as a WiMAX network acting as one example of a mobile communication system, a WiFi network, etc.) may be present in the current communication environment. The heterogeneous network is designed to use a communication scheme different from a communication scheme used in a specific network. A heterogeneous MS belongs to a heterogeneous network configured to use a communication scheme different from that of the specific network. For example, on the basis of the WiMAX network and an MS belonging to the WiMAX network, since the WiFi network uses a communication scheme different from that of the WiMAX network, the WiFi network corresponds to a heterogeneous network. The MS belonging to the WiFi network corresponds to a heterogeneous MS. On the basis of the WiFi network, the WiMAX network may correspond to a heterogeneous network, and the MS belonging to the WiMAX network may correspond to a heterogeneous MS. The multi-mode MS is a specific MS for supporting the use of two or more heterogeneous networks (or a plurality of RATs). The term "WiFi" means a local area network (LAN) for enabling each MS to use a high speed Internet within a predetermined range from an installation location of the AP, and may also be referred to as a wireless LAN configured to use either propagation or infrared ray (IR) transmission.

In order to efficiently transmit/receive signals or improve a throughput in a wireless environment, the MS can transmit signals not only using a radio access technology (RAT) but also using a heterogeneous network supporting a heterogeneous MS. In this case, a multi-mode MS configured to support a plurality of RATs so as to use two or more heterogeneous networks is not limited to a specific RAT, and can transmit/receive signals using a different RAT capable of receiving the best service in a current MS situation. In this case, the number of heterogeneous networks (multiple RATs) connected to the multi-mode MS for signal transmission/reception may be set to 2 or higher. Therefore, the multi-mode MS can perform data transmission/reception independently or collectively using one BS configured to use an RAT different from that of a serving BS and another BS configured to use a heterogeneous network (heterogeneous RAT).

Figure 2:
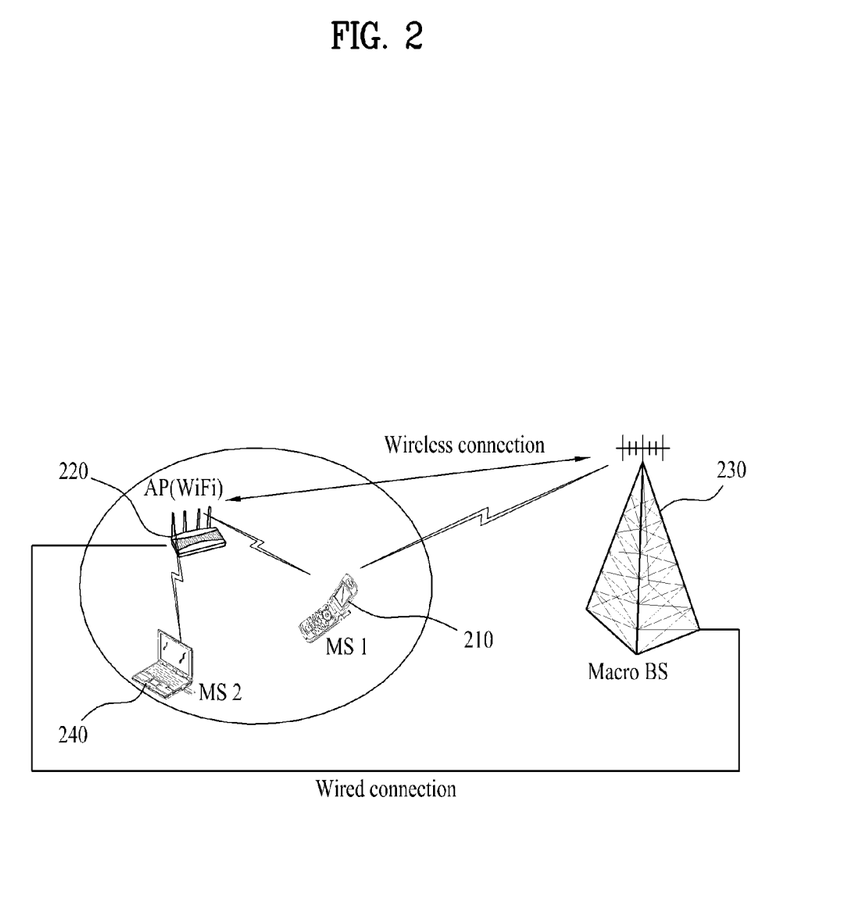
FIG. 2 is a conceptual diagram illustrating a communication environment including two or more heterogeneous networks (multiple RATs).

FIG. 2 is a conceptual diagram illustrating a communication environment including two or more heterogeneous networks (multiple RATs).

Referring to FIG. 2, a mobile station (MS) can transmit/receive signals using two or more heterogeneous networks (or multiple RATs). For example, the MS may transmit/receive signals using a first network (WiMAX network) and a second network (WiFi network). In FIG. 2, a first MS (MS 1) 210 is a multi-mode MS capable of using two or more heterogeneous networks (i.e., multiple RATs). As can be seen from FIG. 2, MS 1 (210) supports multiple modes (multi-mode) through which signal transmission/reception can be achieved over the WiFi network and the WiMAX network. An access point (AP) corresponding to a BS of the WiFi network can communicate with a BS 230 of the WiMAX network through a wired or wireless link in such a manner that information or data transmission/reception between the AP 220 and the BS 230 can be achieved. Accordingly, in order to support MS 1 (210), the AP 220 acting as a BS of the second network can directly communicate with a macro BS 230 acting as a BS of the first network.

In FIG. 2, the AP 220 supporting only the WiFi network is disclosed only for illustrative purposes, and the AP 220 can support not only the WiFi MS but also the WiMAX MS. It should be noted that categories and numbers of heterogeneous networks (multiple RATs) used by MS 1 (210) for signal transmission/reception are not limited thereto.

Since MS 1 (210) is a multi-mode MS supporting a plurality of RATs of a heterogeneous network, the MS 1 (210) can transmit/receive signals to/from the AP 220 and the macro BS 230, or can transmit/receive signals to/from both the AP 220 and the macro BS 230. It may be possible to use some scenarios for allowing the MS 1 (210) to efficiently perform signal transmission/reception using a plurality of heterogeneous networks.

In accordance with a first scenario, MS 1 (210) acting as the multi-mode MS can transmit/receive signals to/from the BS (e.g., AP of the WiFi network) of the first network.

Provided that MS 1 (210) is located indoors or transmits/receives signals to/from the AP 220 without mobility, if the MS 1 (210) with mobility moves within a coverage of the AP 220 or deviates from the coverage of the AP 220, the MS 1 (210) can transmit/receive signals through the WiMAX network corresponding to the second network present in a wireless environment in such a manner that the MS 1 (210) can more efficiently transmit/receive signals simultaneously while maintaining MS mobility.

In accordance with a second scenario, MS 1 (210) can communicate with the BS (e.g., macro BS of the WiMAX network) of the second network.

Provided that MS 1 (210) is located outdoors and then located indoors, the MS 1 (210) can connect to the BS (e.g., WiFi AP) of the first network so that it can efficiently perform signal (or data) transmission/reception. In this case, mobility of the MS 1 (210) disappears, so that the MS 1 (210) connects to the BS (e.g., WiFi AP) of the second network supporting a high data transfer rate so as to increase a data transfer rate of the MS 1 (210), instead of supporting the mobility of the MS 1 (210). As a result, the MS 1 (210) can transmit/receive signals to/from the BS of the second network.

In accordance with a third scenario, MS 1 (210) is handed from a specific RAT associated with current signal transmission/reception to another RAT for implementation of data transmission/reception. In addition, in order to increase data transmission/reception efficiency of the MS 1 (210) as well as to provide a more stable service, the MS 1 (210) maintains a link for signal transmission to the serving BS (for example, the macro BS 230 of the first network corresponding to the WiMAX network, or the BS (e.g., WiFi AP 220) of the second network), and at the same time transmits/receives signals through a different RAT or a heterogeneous network. In this case, MS 1 (210) can simultaneously transmit/receive signals through cooperation of individual heterogeneous networks (or other RATs), or can transmit/receive signals through different links of the individual heterogeneous networks. For example, MS 1 (210) can receive signals from the BS (e.g., WiFi AP 220) of the second network on downlink in a specific frame, and can transmit signals to the BS (e.g., macro BS 230 of WiMAX) of the first network on uplink in a specific frame.

As described above, when MS 1 (210) transmits/receives signals using the heterogeneous network (multiple RATs), the MS 1 (210) can transmit feedback information of signals received from the BS (e.g., WiFi AP 220) of the first network to the BS (e.g., macro BS 230 of WiMAX) of the second network. In this case, the feedback information may include HARQ ACK/NACK feedback information, Channel Quality Indicator (CQI), Signal to Interference plus Noise Ratio (SINR), interference level information, channel status information (CSI), etc. As described above, the MS 1 (210) can transmit feedback information of signals received from the BS of the first network to the BS of the second network.

The first network BS connects to the BS of the second network either through a wired backbone network or by wirelessly, so that the first network BS can share information with the second network BS. If MS 1 (210) transmits feedback information of signals received from the first network BS to the second network BS, the second network BS can share the feedback information received from the MS 1 (210) with the first network BS through wired or wireless connection. For example, the contention-based connection scheme is used between mobile stations (MSs) configured to receive services from the WiFi AP 220. In accordance with the contention-based connection scheme, it may be impossible for a mobile station (MS) to immediately transmit feedback information of signals having been received from the WiFi AP 220 to the WiFi AP 220. Therefore, MS 1 (210) correctly and quickly transmits feedback information of signals received from the first network BS (e.g., WiFi AP 220) to the second network BS (e.g., WiMAX macro BS 230), so that transmission/reception efficiency of the MS 1 (210) can be increased.

As described above, in order to quickly and correctly feed back feedback information according to a transmission environment and a channel situation, the MS 1 (210) can simultaneously use two or more networks (multiple RATs) or can also use two or more networks (multiple RATs) while being classified according to time, frequency, downlink and uplink. For example, if MS 1 (210) communicates with a plurality of RATs (heterogeneous networks) using two or more heterogeneous networks (e.g., WiFi and WiMAX), the MS 1 (210) can receive data from the WiFi AP 220 so as to implement efficient transmission/reception of signals and efficient transmission/reception of feedback information, and can transmit feedback information related to the received data to the macro BS 230 over the WiMAX network in such a manner that the feedback information can be more efficiently transmitted to the serving BS at higher speed.

Figure 3:
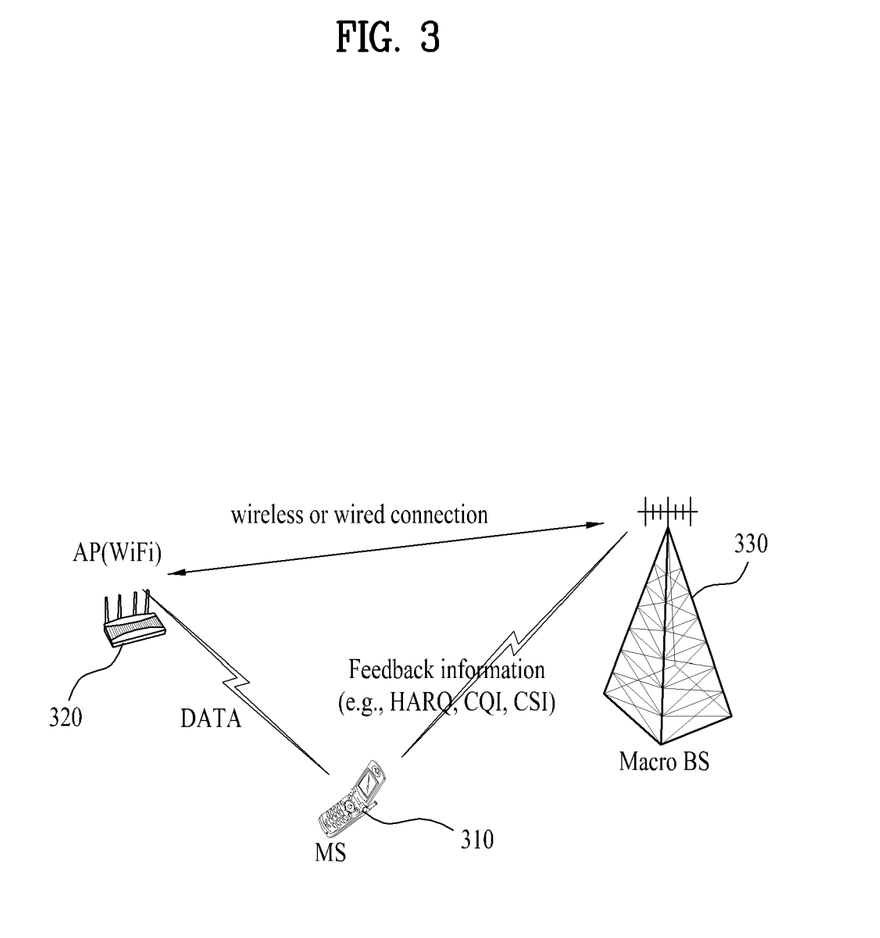
FIG. 3 is a conceptual diagram illustrating a feedback configuration for use in a communication environment including two or more heterogeneous networks (multiple RATs).

FIG. 3 is a conceptual diagram illustrating a feedback configuration for use in a communication environment including two or more heterogeneous networks (multiple RATs).

Referring to FIG. 3, the MS 310 can classify a plurality of RATs (two or more heterogeneous networks) according to data transmission and feedback transmission. As shown in FIG. 3, the MS can transmit/receive signals and feedback information using the first network (WiFi) and the second network (WiMAX).

For example, the MS 310 capable of transmitting/receiving signals using a plurality of RATs can receive signals from the AP 320 using the first network (WiFi), and can transmit received signals and/or channel status information (CSI) related to the received signals to the macro BS 330 using the second network (WiMAX). While the MS 310 receives signals from the macro BS 330 acting as the serving BS during initial signal(data) transmission, if a current situation (e.g., mobility, data transfer rate, channel state, etc.) of the MS 320 is changed, the MS 310 can transmit/receive signals using a plurality of RATs so as to implement efficient signal transmission/reception.

When the MS 310 receives signals through the first network BS (e.g., WiFi AP 320), the MS 310 can feed back signals received from the first network BS (WiFi AP) 320 and/or feedback information (e.g., channel state, ACK/NACK, etc.) related to the received signals to the second network BS through a feedback channel allocated by the second network BS (e.g., macro BS) 330. Alternatively, for the MS 310 operated using a plurality of RATs, the MS 310 can transmit signals received from the first network BS (e.g., WiFi AP 320) and/or feedback information related to the received signals to the second network BS (e.g., macro BS) 330 through a new feedback channel allocated by the second network BS (e.g., macro BS) 330

If the MS 310 receives signals through the first network BS (e.g., WiFi AP) 320, the MS 310 needs to receive channel information for transmission of feedback information from the second network BS (e.g., WiMAX macro BS) 330 so as to use a plurality of RATs. In this case, the first network BS (e.g., WiFi AP) 320 can transmit the channel information for feedback to the MS 310 through communication between the first network BS (e.g., WiFi AP) 320 and the second network BS (e.g., WiMAX macro BS) 330.

The MS 310 can transmit channel state information (e.g., effective channel matrix, CQI, etc.) of signals received from the AP 320 and information [e.g., SINR, interference level, RSSI (Received Signal Strength Indication), ACK/NACK, etc.] of the received signals to the macro BS 330 through an uplink feedback channel allocated by the BS. The macro BS can transmit feedback information to the AP 320 through wired connection (e.g., backbone) or wireless connection. For convenience of description, the MS 310 receives data through WiFi and transmits feedback information related to the received data to the macro BS 330 through WiMAX as shown in FIG. 3, or vice versa.

If the MS 310 uses a plurality of RATs using the above-mentioned method, the MS 310 needs to receive control signals (e.g., in case of IEEE 802.16m, a preamble, a superframe header (SFH), A-MAP, etc.) transmitted from the macro BS 330 in such a manner that the MS 310 can receive a feedback channel from the macro BS 330. Therefore, in order to allow the MS 310 to effectively receive control signals from the macro BS 330, the MS 310 can perform the following operations.

Figure 4:
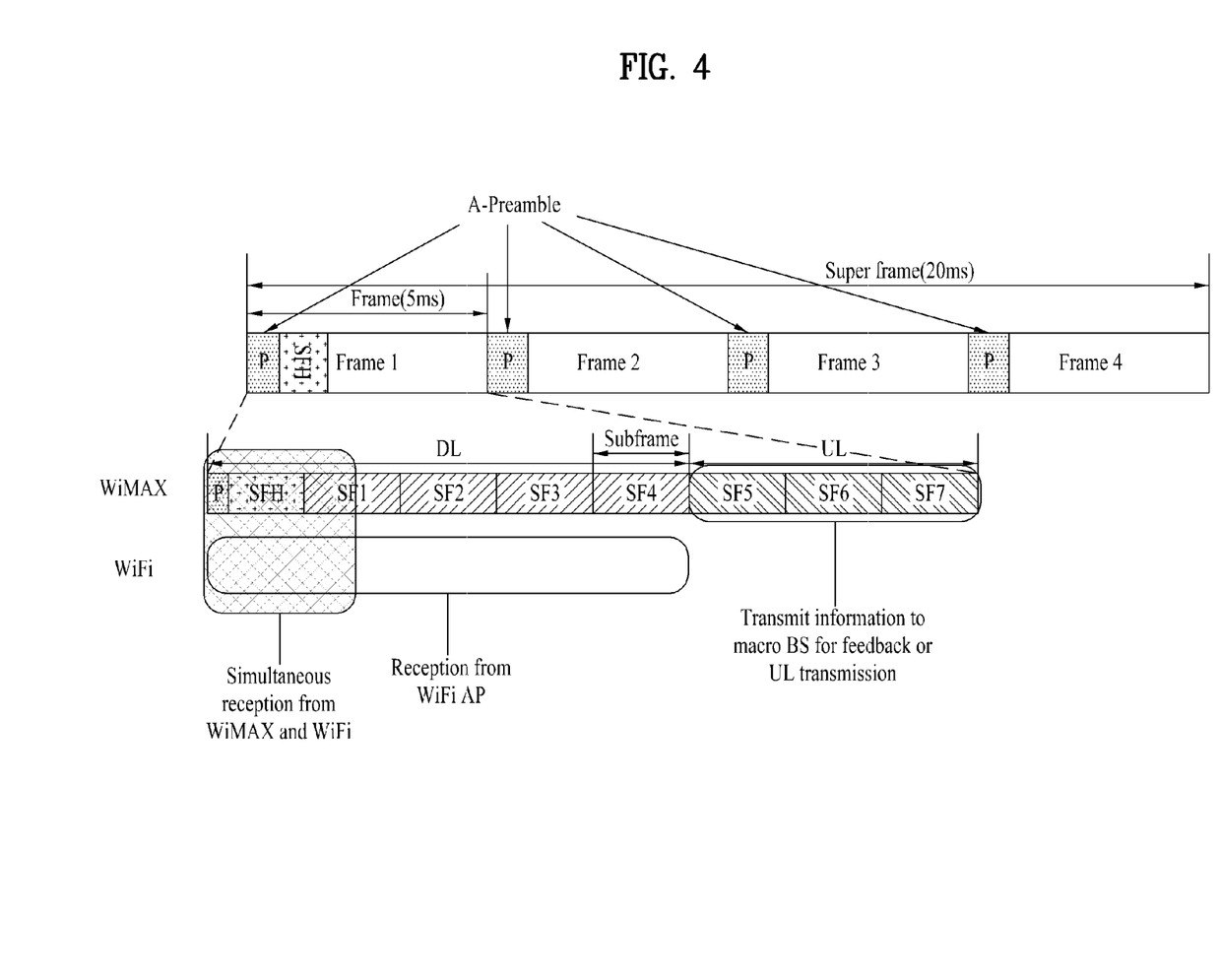
FIG. 4 is a conceptual diagram illustrating a frame structure in which a mobile station (MS) is operated using a plurality of RATs according to one embodiment of the present invention.

FIG. 4 is a conceptual diagram illustrating a frame structure in which a mobile station (MS) is operated using a plurality of RATs according to one embodiment of the present invention.

Referring to FIG. 4, the MS 310 can simultaneously receive signals of the first network (WiFi) and signals of the second network (WiMAX) from the macro BS 330 simultaneously using two or more RF signals. The MS 310 can obtain information of a feedback channel allocated by the second network BS (WiMAX macro BS) 330, and can transmit feedback information of signals received through the first network (WiFi) to the second network BS (WiMAX macro BS) 330 through the allocated feedback channel.

Referring to FIG. 4, the MS 310 can transmit/receive signals through the first network (WiFi) and the second network (WiMAX). The MS 310 needs to receive an A-Preamble, an SFH, A-MAP, etc. from the second network BS (WiMAX macro BS) 330. Therefore, within a specific subframe or slot via which the first network BS (WiFi AP) transmits signals, the MS 310 can simultaneously receive not only signals from the first network BS (WiFi AP) but also a control signal from the second network BS (WiMAX macro BS) 330. Likewise, the MS 310 simultaneously receives a control signal from the second network BS (WiMAX macro BS) 330 and signals received from the first network BS (WiFi AP), so that the MS 310 need not stop other RAT communication for a predetermined time so as to receive signals through a specific RAT.

As can be seen from FIG. 4, the MS 310 can simultaneously receive signals from the first network and the second network within first and second downlink subframes of a specific frame via which control signals (SFH, preamble, etc.) are transmitted. During an interval composed of the first to fifth downlink subframes, the MS 310 can receive signals from the first network BS (WiFi AP), and can transmit feedback information to the second network BS (WiMAX macro BS) 330 on a subsequent uplink.

Figure 5:
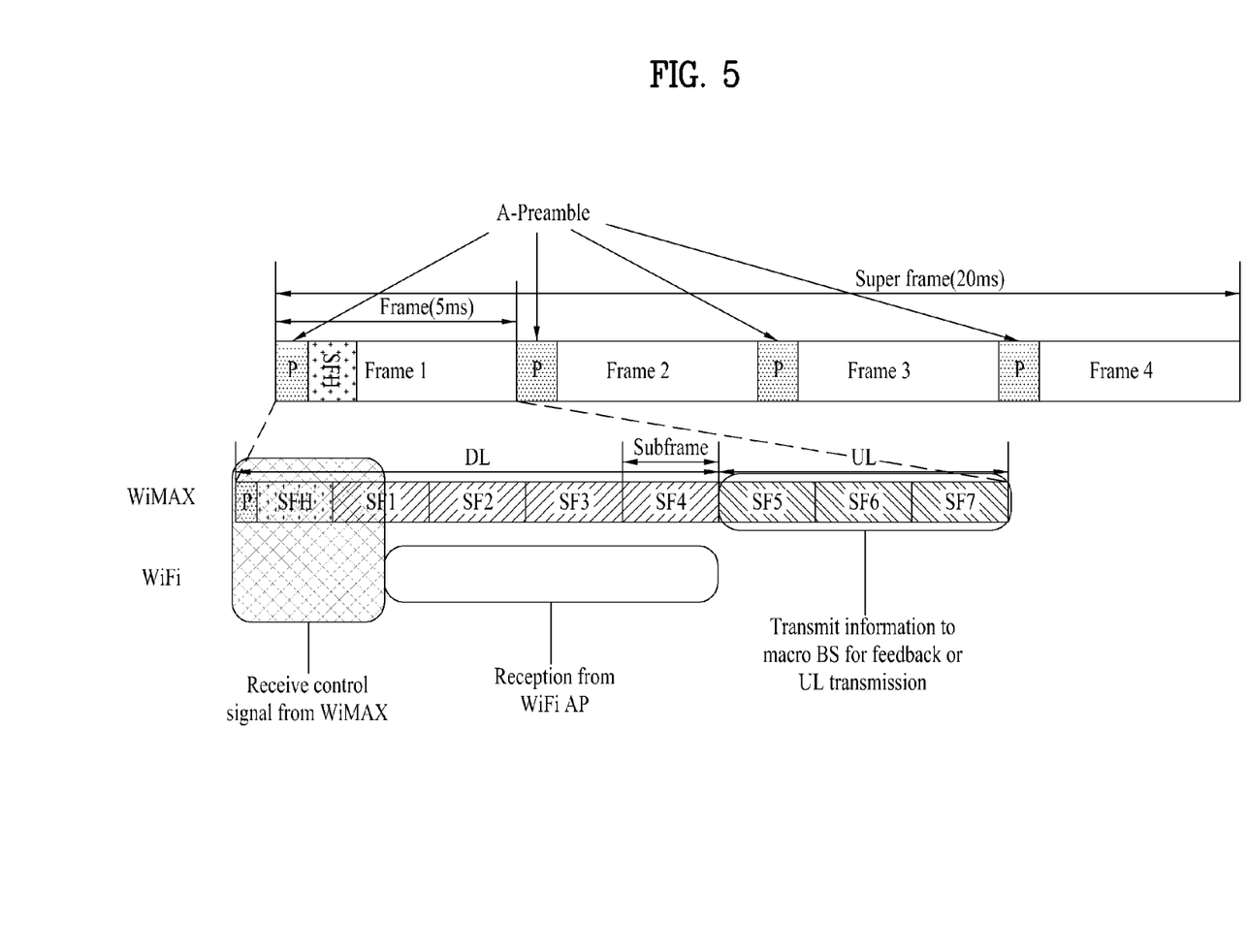
FIG. 5 is a conceptual diagram illustrating a frame structure in which a mobile station (MS) is operated using a plurality of RATs according to another embodiment of the present invention.

FIG. 5 is a conceptual diagram illustrating a frame structure in which a mobile station (MS) is operated using a plurality of RATs according to another embodiment of the present invention.

Referring to FIG. 5, provided that the MS 310 does not simultaneously support two or more heterogeneous networks when transmitting/receiving signals using a plurality of RATs, the MS 310 can transmit/receive signals using the second network (WiMAX) during a predetermined interval (e.g., first and second subframes) of a specific frame so as to receive a control signal from the second network BS (WiMAX macro BS) 330. During the predetermined interval, the control signal is transmitted. After receiving the control signal from the BS, the MS 310 can receive signals from the first network BS (WiFi AP) 320 during the interval composed of third to fifth subframes. The MS 310 can transmit feedback information of the received signals to the second network BS (WiMAX macro BS) 330 using a feedback channel allocated by the control signal received from the second network BS (WiMAX macro BS) 330 during a predetermined time.

As described above, the MS 310 cannot simultaneously receive signals of the first network BS (WiFi AP) 320 and signals of the second network BS (WiMAX macro BS) 330, so that the MS 310 can receive signals from the second network BS (WiMAX macro BS) 330 during an interval composed of the first and second subframes, and can receive signals from the first network BS (WiFi AP) 320 during an interval composed of the remaining third to fifth subframes. As a result, the MS 310 cannot simultaneously receive signals of the first network BS (WiFi AP) 320 and signals of the second network BS (WiMAX macro BS) 330.

The subframe for control signal transmission of FIG. 5 is disclosed only for illustrative purposes, and an interval used for transmitting/receiving signals using the first network (WiFi) and the second network (WiMAX) according to the position of a subframe via which the control signal is transmitted may be changed.

Although FIG. 4 or 5 exemplarily shows the ratio (5:3) of a DL subframe to a UL subframe on the basis of a Time Division Duplexing (TDD) system, the ratio of a DL subframe to a UL subframe is not limited to 5:3, and can be determined to be various ratios (6:2, 4:4, 3:3). In addition, the frame structures of FIGS. 4 and 5 can also be applied not only to a TDD mode but also to an FDD mode. The number of subframes contained in each frame is not limited thereto, and can also be applied to various other ratios of the number of DL subframes to the number of UL subframes.

As described above, provided that the MS 310 transmits/receives signals using a plurality of RATs, the MS 310 receives a signal(data) from the first network BS (WiFi AP) 320 in consideration of data, feedback transmission efficiency, data transfer rate, transfer rate, etc., and can transmit feedback information of the received signal(data) to the second network BS (WiMAX macro BS) 330. That is, the MS 310 having received signals from the WiFi AP 320 can correctly and quickly transmit HARQ ACK/NACK (also called ACK/NACK) information acting as one example of feedback information of the received signal to the macro BS 330 over another heterogeneous network (e.g., WiMAX) channel.

Figure 6:
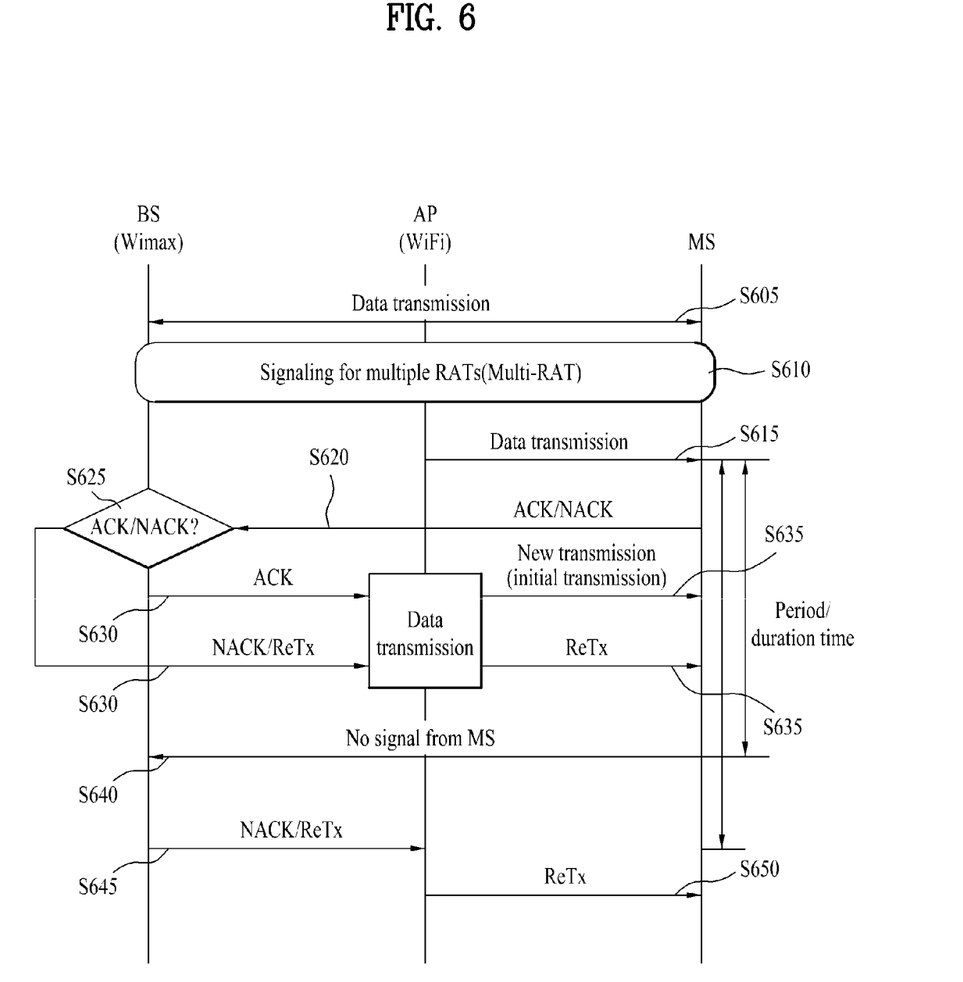
FIG. 6 is a flowchart illustrating a method for performing an HARQ procedure of data or signals received from a specific network by a multi-mode MS.

FIG. 6 is a flowchart illustrating a method for performing an HARQ procedure of data or signals received from a specific network by a multi-mode MS.

Referring to FIG. 6, the multi-mode MS can transmit/receive signals using a specific RAT before transmitting/receiving signals using a plurality of RATs in step S605. The serving BS, a BS of another RAT, or a BS of a specific RAT can perform signaling in such a manner that the multi-mode MS can transmit/receive signals using a plurality of heterogeneous networks (or a plurality of RATs) in step S610. In this case, the second network BS (e.g., WiMAX macro BS) can receive signaling information indicating a specific time where the first network BS (e.g., WiFi AP) transmits signals to the multi-mode MS. In addition, the multi-mode MS may receive a channel to be used for transmission of HARQ feedback information from the second network BS (WiMAX macro BS) through signaling, or may receive information of an HARQ feedback channel of another RAT from the first network BS (WiFi AP).

The multi-mode MS can receive signals from the AP from among a plurality of RATs through the WiFi network in step S615. The multi-mode MS detects an error of the received signal, and determines which one of the ACK signal and the NACK signals is to be transmitted in step S625. If the error has been detected from the received signal, after lapse of a predetermined delay time or a processing time, the multi-mode MS can transmit a NACK signal to the WiMAX macro BS using a feedback channel allocated from a macro BS or an AP (another RAT) in step S630. In contrast, if no errors have been detected from the received signal, the multi-mode MS can transmit an ACK signal to the WiMAX macro BS using the feedback channel in step S630. In this case, the delay time or the processing time information may be received through signaling for a plurality of RATs. HARQ feedback information transmitted in step S630 by the multi-mode MS may be signals (or data) received from the AP during one or more slots. In addition, ACK/NACK signals can be transmitted in units of a subframe so as to achieve frame alignment with the WiMAX frame structure.

The WiMAX macro BS having received HARQ feedback information from the multi-mode MS can transmit ACK/NACK information to the WiFi AP through a connection link (wired or wireless channel) between the multi-mode MS and the AP in step S635. That is, in the case of the WiFi AP having received HARQ feedback information of data from the WiMAX macro BS through a radio frequency (RF) channel or a wireless link (e.g., a backbone network), if the WiFi AP receives an ACK signal, new data is transmitted to the multi-mode MS. If the WiFi AP receives a NACK signal or retransmission information, retransmission of the transmitted data can be carried out in step S635.

If the WiMAX macro BS does not receive HARQ feedback information from the multi-mode MS within a predetermined time from a specific time where the WiFi AP transmits signal (data), the WiMAX macro BS determines that the multi-mode MS failed to receive signals from the WiFi AP, and the WiMAX macro BS transmits a retransmission signal (NACK) to the AP, so that the WiFi AP can allow the multi-mode MS to perform retransmission of data. If the WiMAX macro BS does not receive signals from the multi-mode MS during a predetermined time starting from a specific time where the multi-mode MS transmits signals in step S640, the WiMAX macro BS can transmit a NACK signal (retransmission signal) to the WiFi AP in step S645. Thereafter, the WiFi AP can retransmit signals to the multi-mode MS in step S650. Here, the WiMAX macro BS and the WiFi AP can recognize a variety of information through signaling. For example, a predetermined time from a signal transmission time to a specific time where the multi-mode MS transmits ACK/NACK information, a delay time extended to the ACK/NACK transmission time, a specific time where the WiMAX macro BS transmits ACK/NACK signals to the WiFi AP, a delay time extended to the transmission time, a retransmission time of the WiFi AP, or a delay time extended to the retransmission time can be recognized by the WiMAX macro BS an the WiFi AP through signaling.

In addition, the WiMAX macro BS, the WiFi AP, and the multi-mode MS can prevent collision among predetermined ACK/NACK transmission time points or retransmission time points, and can change the ACK/NACK transmission time point or the data retransmission time point through mutual signaling so as to efficiently perform efficient signal(data) transmission. In case of ACK/NACK transmission time point and data retransmission time point transmitted through signaling, the ACK/NACK transmission time point or the data retransmission time point may be represented in units of a frame, a subframe, a slot or a Transmission Time Interval (TTI), or may be represented by a predetermined delay time starting from either a data transmission time point or an ACK/NACK transmission time point.

As described above, the multi-mode MS correctly and quickly transmits HARQ feedback information of signals having been received through a heterogeneous network (another RAT) (for example, WiFi AP) using a specific network (for example, WiMAX macro BS), so that erroneous or wrong signals can be quickly retransmitted, resulting in increased reliability of transmitted/received signals.

Therefore, the multi-mode MS transmits data and associated feedback information (e.g., HARQ, CQI, channel matrix, SINR, RSSI, interference level) using other RATs, so that the frequency efficiency and the data transmission efficiency can be increased.

A method for allowing the multi-mode MS to inform a first network of an ACK/NACK signal indicating success or failure of communication with the second network upon receiving an indication message for enabling the multi-mode MS communicating with the first network to communicate with a second network different from the first network will hereinafter be described in detail.

Embodiment for ACK Signal

The multi-mode MS may receive a communication indication message from the first network BS (for example, WiMAX macro BS) using the second network (or another RAT). The indication message may be generated from the first network BS, or may be a multi-mode MS initiated approval message. The multi-mode MS can perform communication using the second network (or another RAT) indicated from the first network BS (for example, WiMAX macro BS). While the multi-mode MS performs communication using the second network (or another RAT), a specific time may operate. A maximum value of the timer may be predetermined or may be directly or indirectly indicated from the first network BS (for example, WiMAX macro BS).

If the multi-mode MS has successfully completed communication indicated by the second network (or another RAT) within a predetermined timer value (for example, if another communication supports the HARQ scheme or receives the ACK signal), the multi-mode MS can inform the first network BS (e.g., the WiMAX macro BS) of the success of indicated communication. That is, the multi-mode MS can transmit an ACK signal for the entire communication indicated by the second network (or another RAT) to the first network BS (e.g., WiMAX macro BS). Although only one ACK signal for all other RATs or other networks is disclosed only for illustrative purposes, it should be noted that the above-mentioned operation can also be achieved by a plurality of ACKs (for example, in units of a specific data burst, in units of a specific resource, in units of a specific time, in units of a connection attempt for use in another specific RAT or another specific network).

The first network BS (e.g., WiMAX macro BS) having received the ACK signal for the entire communication in the second network (or another RAT) from the multi-mode MS can confirm that the multi-mode MS has successfully completed communication indicated by the second network (or another RAT).

Since the multi-mode MS receives an ACK signal from the second network (or another RAT), the first network BS (e.g., WiMAX macro BS) can correctly and quickly recognize successful completion of communication indicated by the second network (or another RAT). Therefore, the first network BS (e.g., WiMAX macro BS) can efficiently and quickly perform subsequent management and control of the corresponding multi-mode MS. In this case, as an example of such subsequent management and control, the MS may perform another communication, enter an MS sleep mode, or enter an MS idle mode.

Embodiment of NACK

The multi-mode MS can receive a communication indication message based on the second network (or another RAT) from the first network BS (e.g., WiMAX macro BS). Such indication may be generated from the first network BS, and may be a multi-mode MS initiated approval. The multi-mode MS can perform communication using the second network (or another RAT) indicated by the first network BS (e.g., WiMAX macro BS). While the multi-mode MS performs communication using the second network (or another RAT), a specific timer may operate. A maximum value of the timer may be predetermined or may be directly or indirectly indicated from the first network BS (for example, WiMAX macro BS).

If the multi-mode MS has failed in communication indicated from the first network BS (e.g., WiMAX macro BS) in the second network (or another RAT) within a predetermined timer value (for example, if the multi-mode MS cannot perform communication due to high load of the second network (or another RAT, or if the multi-mode MS does not receive the ACK signal when the second network (or another RAT) communication supports HARQ), the multi-mode MS may inform the first network BS of the failure of communication indicated by the first network BS (e.g., WiMAX macro BS). That is, the multi-mode MS can transmit a NACK signal for the entire communication indicated by the second network (or another RAT) to the first network BS (e.g., WiMAX macro BS).

Although only one NACK signal for all other RATs or other networks is disclosed only for illustrative purposes, it should be noted that the above-mentioned operation can also be achieved by a plurality of ACKs (for example, in units of a specific data burst, in units of a specific resource, in units of a specific time, in units of a connection attempt for use in another specific RAT or another specific network). In this case, provided that the multi-mode MS does not communicate with the second network (or another RAT) [for example, if the multi-mode MS receives an indication message for communication with the second network (or another RAT), if the network or RAT does not exist, if there is a large amount of load, or if it is impossible to use the multi-mode MS due to a connection collision or a connection denial], the multi-mode MS can also transmit the NACK signal to the first network BS (e.g., WiMAX macro BS) before expiration of the timer.

Since the first network BS (e.g., WiMAX macro BS) receives a NACK signal for the entire communication in the second network (or another RAT) from the multi-mode MS, it may determine that communication of the multi-mode MS was failed in the second network (or another RAT). In addition, a maximum timer setup time to be consumed until the first network BS (e.g., WiMAX macro BS) receives the HARQ ACK/NACK feedback signal may be pre-established. In this case, if no HARQ ACK/NACK feedback signal is received until reaching the maximum timer setup time, the first network BS may determine an objective signal to be a NACK signal.

Thereafter, the first network BS (e.g., WiMAX macro BS) may command the multi-mode MS to reattempt communication of the data/control signal through a radio interface or a third network (or a third RAT). In the case of using a plurality of ACK/NACK feedback signals, reattempting communication of only data or control signal corresponding to the NACK signal instead of the entire data or control signal may also be indicated as necessary.

As described above, the multi-mode MS receives information indicating the used or unused state of the timer for the second network (or another RAT) or transmits the NACk signal, so that the multi-mode MS can quickly and correctly recognize whether the first network BS (e.g., WiMAX macro BS) fails to communicate with the second network (or another RAT). There are a variety of examples of such subsequent management and control, for example, re-execution of communication based on a radio interface, re-execution of a third network (or third RAT), etc. If the first network BS (e.g., WiMAX macro BS) transmits an indication message for commanding the multi-mode MS to re-execute communication with the second network, the first network BS may communicate with the second network using a variety of methods (for example, a random backoff, the use of other channels, etc.).

In accordance with the aforementioned embodiments for ACK and NACK signals, the timer may be optional so that it may not be used. In addition, only one of the ACK signal and the NACK signal may be used for feedback. In more detail, the multi-mode MS having received an indication message for communication with the second network, information regarding the result for only one predetermined state from among ACK or NACK signals can be transmitted to the first network BS (e.g., WiMAX macro BS). Provided that the multi-mode MS feeds back only the ACK signal, if the first network BS (e.g., WiMAX macro BS) does not receive the ACK signal until reaching a maximum timer setup time where the feedback information is to be received, the corresponding signal may be determined to be a NACK signal. In contrast, provided that only the NACK signal is fed back, the first network BS (e.g., WiMAX macro BS) may determine the corresponding signal to be the ACK signal on the condition that no NACK signal is received until reaching a maximum timer setup time where feedback information is to be received.

Figure 7:
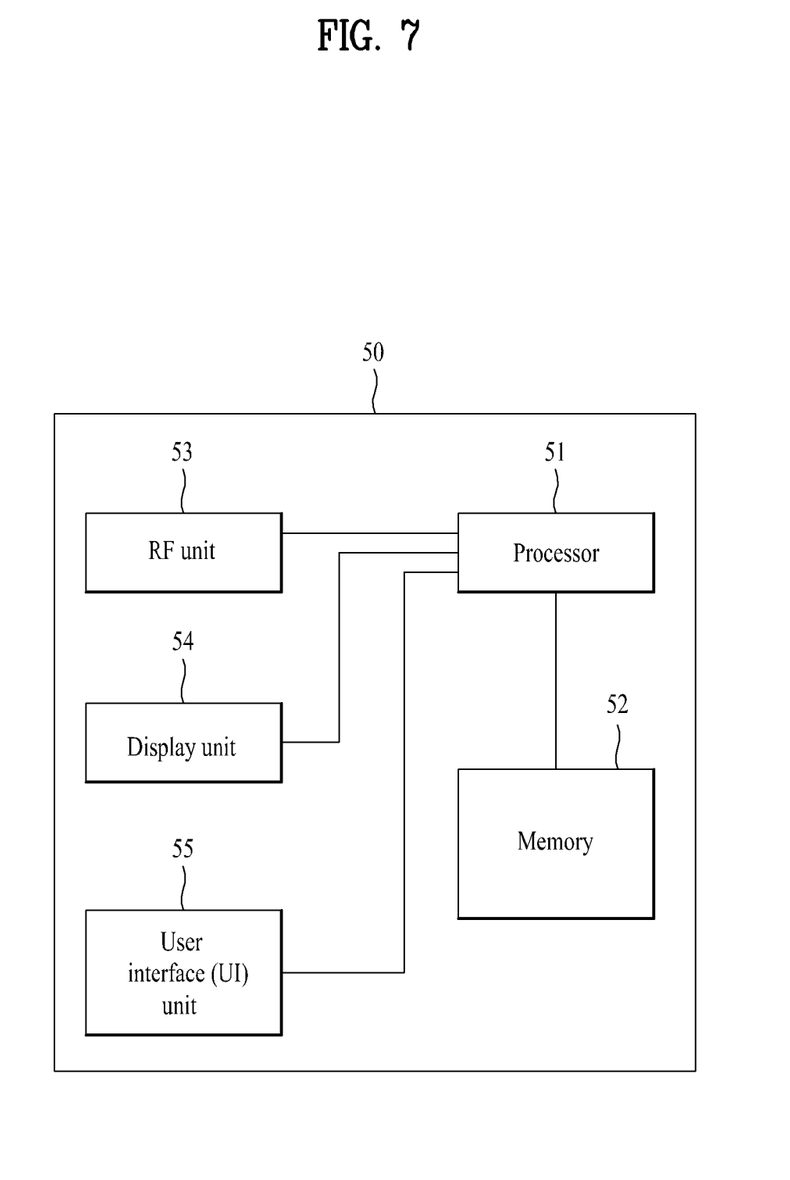
FIG. 7 is a block diagram illustrating constituent elements of a device according to an embodiment of the present invention.

FIG. 7 is a diagram illustrating constituent elements of a device 50 according to an embodiment of the present invention. Referring to FIG. 7, the device 50 includes a processor 51, a memory 52, a Radio Frequency (RF) unit 53, a display unit 54, and a user interface unit 55. Layers of the radio interface protocol are implemented in the processor 51. The processor 51 provides a control plane and a user plane. The processor 51 may perform functions of each layer. The processor 51 may include a contention resolution timer. The memory 52, which is electrically connected to the processor 51, stores an operating system, application programs, and general files. If the device 50 is a UE, the display unit 54 may display various pieces of information and be configured with a Liquid Crystal Display (LCD), an Organic Light Emitting Diode (OLED), etc. which are known in the art. The user interface unit 55 may be configured to be combined with a known user interface such as a keypad, a touch screen, or the like. The RF unit 53, which is electrically connected to the processor 51, transmits and receives RF signals. The RF unit may be classified into a processor transmission (Tx) module (not shown) and a processor reception (Rx) module (not shown). The RF unit 53 receives control information including zone allocation information from the BS, and the processor 51 can control the MS device 50 to communicate with the BS through the corresponding zone on the basis of the zone allocation information.

Radio interface protocol layers between the UE and a network can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE and the network may exchange RRC messages with each other through the RRC layer.

Exemplary embodiments described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. Also, it will be obvious to those skilled in the art that claims that are not explicitly cited in the appended claims may be presented in combination as an exemplary embodiment of the present invention or included as a new claim by subsequent amendment after the application is filed.

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method for allowing a mobile station supporting two or more radio access technologies to communicate with two or more networks according to the embodiments of the present invention can be applied to various mobile communication systems, for example, IEEE 802, 3GPP LTE, LTE-A, and the like.

The invention claimed is:
1. A method for performing, by a mobile station (MS) supporting two or more radio access technologies, communication with two or more networks, the method comprising:
receiving, by the MS while being served in a cellular network and a wireless local area network (WLAN), a signal from the WLAN; and
receiving, by the MS from the cellular network, control information including information about a feedback channel;
transmitting, by the MS to either the cellular network or the WLAN, feedback information regarding the WLAN through the feedback channel,
wherein the cellular network allocates a cellular uplink resource by a non-contention based scheme and the WLAN allocates a WLAN uplink resource by a contention based scheme in which the MS competes with other MSs to obtain the WLAN uplink resource, wherein, if the MS has failed to obtain the WLAN uplink resource from the WLAN within a predetermined time by the contention based scheme, the feedback information is transmitted to the cellular network via the cellular uplink resource allocated by the non-contention based scheme, and wherein the information about the feedback channel includes cellular uplink resource allocated for transmitting the feedback information to the cellular network.

2. The method according to claim 1,
wherein the feedback information includes:
WLAN channel state information based on the received signal,
WLAN interference level information based on the received signal, and
either WLAN acknowledgement (ACK) or WLAN negative acknowledgement (NACK) information based on the received signal.

3. The method according to claim 1, wherein the MS simultaneously receives the control information from the cellular network and the signal from the WLAN during a specific subframe interval.

4. The method according to claim 1, wherein the control information from the cellular network and the signal from the WLAN are received through different frequency bands.

5. The method according to claim 2, further comprising:
if the feedback information includes the WLAN ACK information, receiving a new signal from the WLAN.

6. The method according to claim 2, further comprising:
if the feedback information includes the WLAN NACK information, re-receiving the same signal as the signal received from the WLAN.

7. A mobile station (MS) for communicating with two or more networks, comprising:
a receiver;
a transmitter; and
a processor operatively connected to the receiver and the transmitter, the processor configured to:
while being served in a cellular network and a wireless local area network (WLAN), receive a signal from the WLAN;
receive, from the cellular network, control information including information about a feedback channel; and
transmit, to either the cellular network or the WLAN, feedback information regarding the WLAN through the feedback channel, wherein the cellular network allocates a cellular uplink resource by a non-contention based scheme and the WLAN allocates a WLAN uplink resource by a contention based scheme in which the MS competes with other MSs to obtain the WLAN uplink resource, wherein, if the MS has failed to obtain the WLAN uplink resource from the WLAN within a predetermined time by the contention based scheme, the feedback information is transmitted to the cellular network via the cellular uplink resource allocated by the non-contention based scheme, and wherein the information about the feedback channel includes the cellular uplink resource allocated for transmitting the feedback information to the cellular network.

8. The mobile station (MS) according to claim 7, wherein the processor is configured to simultaneously receive the control information from the cellular network and the signal from the WLAN during a specific subframe interval.

9. The mobile station (MS) according to claim 7, wherein the control information from the cellular network and the signal from the WLAN are received through different frequency bands.

10. The mobile station (MS) according to claim 7, wherein the processor is configured to receive a new signal from the WLAN if the feedback information includes WLAN ACK information.

11. The mobile station (MS) according to claim 7, wherein the processor is configured to re-receive the same signal as the signal received from the WLAN if the feedback information includes WLAN NACK information.

12. The method of claim 1, wherein the feedback information regarding the WLAN is forwarded to the WLAN by the first network.

13. The method according to claim 2, wherein if the WLAN ACK or the WLAN NACK information is not received in the cellular network in the predetermined time from a transmission time of the signal, the WLAN NACK information is transmitted to the WLAN by the cellular network.

14. The method of claim 1, wherein if the MS has obtained the WLAN uplink resource from the WLAN within the predetermined time by the contention based scheme, the feedback information is transmitted to the WLAN network via the WLAN uplink resource allocated by the contention based scheme.

* * * * *